United States Patent
Stephensen et al.

(10) Patent No.: US 7,567,179 B2
(45) Date of Patent: Jul. 28, 2009

(54) CONFIGURATION MANAGEMENT SYSTEM AND METHOD FOR USE IN AN RFID SYSTEM INCLUDING A MULTIPLICITY OF RFID READERS

(75) Inventors: Robert A. Stephensen, Carlisle, MA (US); Michael Grady, Boston, MA (US); Scott Barvick, Arlington, MA (US); David J. Husak, Windham, NH (US); Lin Zhou, Action, MA (US); Nirav R. Shah, Westford, MA (US); Pattabhiraman Krishna, Westbourough, MA (US); Jeffrey H. Fischer, Boston, MA (US); Chilton L. Cabot, Dedham, MA (US)

(73) Assignee: Reva Systems Corporation, Chelmsford, MA (US)

( * ) Notice: Subject to any disclaimer, the term of this patent is extended or adjusted under 35 U.S.C. 154(b) by 337 days.

(21) Appl. No.: 11/581,788

(22) Filed: Oct. 16, 2006

(65) Prior Publication Data

US 2007/0099623 A1 May 3, 2007

Related U.S. Application Data

(60) Provisional application No. 60/727,453, filed on Oct. 17, 2005.

(51) Int. Cl.
*G08B 13/141* (2006.01)
(52) U.S. Cl. .............. 340/572.1; 340/568.1; 340/10.51; 235/462.01
(58) Field of Classification Search ... 340/572.1–572.9, 340/568.1, 10.1, 10.5, 907, 928, 825, 10.3, 340/10.31, 10.51; 235/462.01, 462.15, 472.01, 235/439
See application file for complete search history.

(56) References Cited

U.S. PATENT DOCUMENTS 4,636,950 A 1/1987 Caswell et al.

(Continued)

FOREIGN PATENT DOCUMENTS

| EP | 1727042 A1 | 11/2005 |
|----|------------|---------|
| WO | WO 2006/109700 A1 | 10/2006 |

*Primary Examiner*—Benjamin C Lee
*Assistant Examiner*—Daniel Previl
(74) *Attorney, Agent, or Firm*—Weingarten, Schurgin, Gagnebin & Lebovici LLP (57) ABSTRACT

A system and method that facilitates the configuration and control of components of an RFID system, taking into account how the RFID system components are associated with one or more physical locations within an environment in which the RFID system is deployed. A user provides information specifying associations between the system components and the physical locations within the environment to obtain visual representations of configuration data generated therefrom with reference to a facility view, an RF coverage view, and a location view of the data. The facility view serves as a reference plane for placement and orientation of antennas associated with RFID readers, location benchmark tags, and the physical locations of interest. After each antenna is placed and oriented on the facility view, an estimate of the size and shape of the RF interrogation zone of each antenna is computed, and representations of the RF interrogation zones are provided on the facility view to obtain the RF coverage view of the data. Next, the user provides information specifying the physical locations of interest to obtain the location view of the data. A composite of the facility view, the coverage view, and the location view is then generated to obtain an enhanced visual understanding of how the system components and the physical locations exist within the system environment, and how the components and locations are associated with one another.

26 Claims, 7 Drawing Sheets

U.S. PATENT DOCUMENTS

| | | | |
|---|---|---|---|
| 5,649,296 A * | 7/1997 | MacLellan et al. | 455/39 |
| 5,822,714 A * | 10/1998 | Cato | 702/108 |
| 6,011,597 A | 1/2000 | Kubo | 348/725 |
| 6,040,774 A * | 3/2000 | Schepps | 340/572.1 |
| 6,150,921 A * | 11/2000 | Werb et al. | 340/10.1 |
| 6,177,861 B1 | 1/2001 | MacLellan et al. | 340/10.1 |
| 6,608,551 B1 | 8/2003 | Anderson et al. | 340/10.1 |
| 6,625,454 B1 | 9/2003 | Rappaport et al. | |
| 6,804,537 B1 | 10/2004 | Fujii | |
| 7,132,948 B2 | 11/2006 | Sweeney, II | |
| 7,256,682 B2 | 8/2007 | Sweeney, II | |
| 7,262,701 B1 * | 8/2007 | Nguyen | 340/572.7 |
| 7,298,270 B2 | 11/2007 | Ishiguro et al. | |
| 7,411,921 B2 * | 8/2008 | Strong et al. | 370/328 |
| 7,416,122 B2 | 8/2008 | Sato | |
| 2005/0012613 A1 | 1/2005 | Eckstein et al. | |
| 2005/0109844 A1 | 5/2005 | Hilliard | |
| 2005/0154570 A1 | 7/2005 | Sweeney | 703/13 |
| 2005/0154572 A1 | 7/2005 | Sweeney, II | |
| 2005/0222999 A1 | 10/2005 | Nihei | |
| 2005/0231370 A1 | 10/2005 | Tagato | |
| 2006/0049944 A1 | 3/2006 | Ishiguro et al. | |
| 2006/0082444 A1 | 4/2006 | Sweeney, II et al. | 340/10.1 |
| 2006/0158313 A1 | 7/2006 | Satou | |
| 2006/0175407 A1 | 8/2006 | Kinoshita | |
| 2007/0069022 A1 | 3/2007 | Hatakeyama et al. | |
| 2007/0132583 A1 | 6/2007 | Sweeney, II | |
| 2007/0136036 A1 | 6/2007 | Sweeney, II et al. | |
| 2007/0222591 A1 | 9/2007 | Kimata | |
| 2007/0229216 A1 | 10/2007 | Yasuda | |
| 2007/0229280 A1 | 10/2007 | Akiguchi et al. | |
| 2008/0022290 A1 | 1/2008 | Ochiai et al. | |
| 2008/0234862 A1 | 9/2008 | Funada et al. | |
| 2008/0250117 A1 | 10/2008 | Nihei | |

* cited by examiner

CONFIGURATION MANAGEMENT SYSTEM AND METHOD FOR USE IN AN RFID SYSTEM INCLUDING A MULTIPLICITY OF RFID READERS

CROSS REFERENCE TO RELATED APPLICATIONS

This application claims benefit of U.S. Provisional Patent Application No. 60/727,453 filed Oct. 17, 2005 entitled CONFIGURATION MANAGEMENT SYSTEM AND METHOD FOR USE IN AN RFID SYSTEM INCLUDING A MULTIPLICITY OF RFID READERS.

STATEMENT REGARDING FEDERALLY SPONSORED RESEARCH OR DEVELOPMENT

Not applicable

BACKGROUND OF THE INVENTION

The present invention relates generally to radio frequency identification (RFID) systems, and more specifically to a system and method of managing the configuration and control of components of an RFID system, taking into account how the RFID system components are associated with one or more physical locations within an environment in which the RFID system is deployed.

In recent years, radio frequency identification (RFID) systems have been employed in an ever increasing range of applications. For example, RFID systems have been employed in supply chain management applications to identify and track merchandise throughout manufacture, warehouse storage, transportation, distribution, and retail sale. RFID systems have also been used in security applications to identify and track personnel for controlling access to restricted areas of buildings and plant facilities, thereby prohibiting access to such areas by individuals without the required authorization. Accordingly, RFID systems have been employed in a number of diverse applications to facilitate the identification and tracking of merchandise, personnel, and other items and/or individuals that need to be reliably monitored and/or controlled within a particular environment.

A conventional RFID system typically comprises at least one RFID reader including at least one RF interrogator and at least one RF receiver, at least one controller or host computer, and at least one RFID transponder or tag. For example, when such a system is deployed in a manufacturing environment, one or more RFID tags may be attached to selected items of manufacture or equipment, and one or more RFID readers may be employed to interrogate the RFID tags as the tagged items pass predefined points on the manufacturing floor. Each of the RFID tags may include a memory for storing information provided to it by one of the RF interrogators. In addition, one or more of the RFID tags may include an integrated transducer or environmental sensor, which may be employed to acquire data relating to the temperature, pressure, and/or humidity level of the ambient environment. RFID tags generally belong to one of the following class categories: identity tags for holding user data (class 1), secure tags (class 2), battery assisted tags containing real time sensors (class 3), and fully battery-operated transceiver-based tags providing interactivity with other similar tags within the RFID system. Because they do not contain a power source, RFID tags belonging to classes 1-2 are called passive tags. Such passive tags typically receive energizing power from an impinging RF field generated by an RF interrogator.

In a typical mode of operation within an exemplary manufacturing environment, the RF interrogator transmits an RF signal in the direction of an RFID tag, which responds to the transmitted signal by generating another RF signal containing information stored on the tag. For example, such information may identify the item to which the RFID tag is attached, and may possibly contain other data acquired during the manufacture of the item. As described above, if the RFID tag includes an environmental sensor, then the tag may also provide data relating to the temperature, pressure, humidity level, etc., of the ambient environment. The RF receiver receives the RF data signal transmitted by the RFID tag, and provides the tag data to the controller or host computer for subsequent processing and decision making based upon the data. In this typical operating mode, the RFID reader can be configured as a peripheral connected to a serial port of the controller or host computer.

More recently, RFID readers have been developed that are capable of being connected via one or more communications networks to enterprise computer resources running one or more RFID-enabled client software applications. Such RFID readers have been employed in complex systems including a multiplicity of readers connected via a number of communications networks to one or more host computers, which may be part of an enterprise network server. For example, such host computers may be configured to run client applications for processing tag data to control access to building and plant facilities, to control the movement of personnel and/or property within a predefined area, to control the operation of lighting, heating, ventilation, and/or air conditioning facilities, and to perform numerous other diverse functions. In addition, networks of RFID readers and other RFID system components can be operated as distributed sensor networks configured to acquire information from multiple points within the system environment, and to combine the acquired information for use in subsequent decision making to achieve a specified business purpose.

Whether implemented as computer peripherals or networked devices, conventional RFID readers generally collect data from RFID tags like optical barcode readers collect data from barcode labels. However, whereas an optical barcode reader typically requires a direct line of sight to a barcode label to read the data imprinted on the label, the RF signals generated by the typical RFID reader can penetrate through and/or diffract around objects obstructing an RFID tag from the RF field of view of the reader, thereby allowing the reader to access data from a tag that, for example, might be buried beneath one or more boxes of material. In addition, the conventional RFID reader can typically operate on and distinguish between multiple RFID tags within the reader's field of view.

However, conventional RFID systems like those described above have drawbacks. For example, when a conventional RFID system including multiple RFID readers is configured to operate within a distributed sensor network, two of the RFID readers may be disposed at points that are far enough apart so that the RF fields generated by the respective readers do not cover the same physical space. Within such a distributed sensor network, a tagged item carried by a conveyor belt or a vehicle may first pass through the RF field of view of one of the RFID readers, and then pass through the RF field of view of the other reader. Based upon the locations of the respective readers within the system environment, and the times when the RFID readers detect the tagged item passing through their respective fields of view, the RFID system can determine the direction of travel of the tagged item.

The operation of such a conventional RFID system can be problematic, however, because various factors such as multipath propagation, RFID tag orientation, shadowing by an obstruction, etc., may prohibit the two RFID readers from successfully interrogating the tagged item at particular angles of interrogation. For example, if the RFID readers are placed too close together within the system environment, then the order in which the readers detect the tagged item within their respective fields of view may vary, thereby making it difficult to determine reliably the direction of travel of the tagged item. Further, one of the RFID readers may fail to detect the tagged item altogether, thereby making it virtually impossible to determine the item's direction of travel. Moreover, interference between the two RFID readers may prohibit the readers from successfully interrogating the tagged item. Such reader-to-reader interference may also prevent the two RFID readers from occupying the same frequency channel in the same time slot within a particular RF domain, resulting in significant degradation in the efficiency of the distributed sensor network.

In addition, conventional RFID systems are often configured such that the various system components, for example, the RF interrogators, the RF receivers, and/or the RFID readers, are provided with designations without maintaining any meaningful associations between the system components and actual physical locations within the system environment. For example, RF interrogators, RF receivers, and/or RFID readers may be provided with names indicating their intended placement and function (e.g., shipping or receiving) within the system environment. However, in conventional RFID system configurations, there is no easy way of tying the named system components to the physical locations corresponding to those functions indicated by the named designations. For example, if one of the named system components is moved from one physical location to another physical location within the system environment, then the name of that system component typically moves with the component, causing the component to remain within the same functional grouping (i.e., shipping or receiving) in which it was originally configured. Conventional RFID system configurations are generally incapable of incorporating any formal understanding of how groups of system components relate to the physical space in which they are employed.

Further complications can result if a system component (e.g., an RF interrogator, an RF receiver, and/or an RFID reader) can be used to perform more than one function. For example, there may be an overlap of the interrogation zones corresponding to two groups of RFID system components configured to perform shipping and receiving functions, respectively. However, conventional RFID systems typically provide no way of unambiguously distinguishing between the interrogation zones corresponding to the shipping functions, and the interrogation zones corresponding to the receiving functions. As a result, when one of the system components can be used for both shipping and receiving, it is difficult to determine whether interrogations performed by that component are associated with the shipping or receiving functions, especially when the component interrogates tagged items located within the overlapping region of the two interrogation zones. Not only may one or more components of the conventional RFID system be used to perform multiple functions, but they may also be associated with more than one physical location within the system environment. This often occurs when RFID system components are mobile. However, as discussed above, in conventional RFID systems, there is no easy way of tying the system components to the physical locations within the system environment, whether those locations are permanent or merely temporary.

It would therefore be desirable to have a system and method of managing the configuration and control of components of an RFID system that maintains specified associations between the system components and actual physical locations within an environment in which the RFID system is deployed. Such a system and method would allow the associations between the system components and the physical locations to be specified in a dynamic fashion based primarily upon how the various components are employed within the system environment. Such a system and method would also allow logical and physical relationships between the system components and the physical locations to be determined in accordance with how the components and locations are associated with one another.

It would also be desirable to have a system and method of visualizing (1) the placement of RFID system components within the RFID system environment with reference to actual physical locations within the environment, (2) the RF coverage areas associated with the various system components disposed at those physical locations, and/or (3) the regions within the system environment in which system components with similar properties are located. Such a system and method would allow properties to be assigned to both the system components and the physical locations, while providing a better understanding of how the components and locations exist within the system environment, leading to more cooperative information gathering among the various system components and more meaningful decision making based upon the acquired information.

BRIEF SUMMARY OF THE INVENTION

In accordance with the present invention, a system and method is provided that manages the configuration and control of components of a radio frequency identification (RFID) system, taking into account how the RFID system components are associated with one or more physical locations within an environment in which the RFID system is deployed. The presently disclosed system and method allows the associations between the system components and the physical locations to be specified in a dynamic fashion based primarily upon how the various components are used within the system environment. The presently disclosed system and method also allows logical and physical relationships between the system components and the physical locations to be determined in accordance with how the components and locations are associated with one another. In addition, by permitting properties to be assigned to both the system components and the physical locations, while presenting an enhanced visual representation of how the components and locations exist within the system environment, the presently disclosed system and method provides for more cooperative information gathering among the various system components, and more meaningful decision making based upon the acquired information, thereby allowing the business purpose of the RFID system to be more easily attained.

In one embodiment, the presently disclosed system and method is configured to operate in conjunction with an RFID system architecture that includes a plurality of RFID transponders or tags, a plurality of RFID readers, at least one host computer running at least one client software application, and at least one mid-level controller/processor in communication with the plurality of RFID readers and the host computer. Within the RFID system architecture, each of the RFID readers includes an RF interrogator and an RF receiver, which may reside in separate units or may be integrated into a single component or device. The mid-level controller/processor is operative to schedule, parameterize, and coordinate RF transmissions generated by the respective RFID readers, to receive tag data from the RFID readers, and to provide raw tag data, processed tag data, RFID reader location information, event information, and/or system status notifications to the host computer. In addition, the mid-level controller/processor is operative to exchange RFID reader control signaling with both the host computer and the RFID readers to provide coordinated control of the multiple readers. By employing the presently disclosed system and method to manage the configuration and control of the RFID readers via the mid-level controller/processor, enhanced RFID tag management functions, higher RFID tag read throughput, improved RF spectrum management, and increased cooperation among the various system components can be achieved.

The present invention can be embodied in a client software application running on a host computer communicably coupled to the mid-level controller/processor. While running the client software application embodying the present invention, the host computer has access to a configuration database within the mid-level controller/processor, which stores information relating to RFID reader locations within the system environment, RFID reader types, location benchmark tags disposed throughout the environment, reader-to-reader interference and interactions, and/or any other suitable system configuration information. In addition, the client software application embodying the present invention may be configured to allow a human operator (the "user") to enter information specifying the associations between the components of the RFID system and the physical locations within the system environment via a graphical user interface (GUI) displayed on a display monitor of the host computer. The client software application processes the information specifying the associations to generate configuration data, which serve as input to signal transmission/time scheduling algorithms executed by the mid-level controller/processor for controlling the various components of the RFID system.

In one mode of operation, the user enters the information specifying the associations between the system components and the physical locations within the system environment via the graphical user interface, which provides visual representations of configuration data generated therefrom from three different but inter-related views, namely, a facility view, an RF coverage view, and a location view. The three different views of the configuration data can be used to generate abstract representations of the configuration data suitable for displaying and editing on the graphical user interface. For example, in the event the RFID system is deployed in a manufacturing environment, the user may import a CAD drawing representing the manufacturing facility layout, or may manually draw the facility layout using the graphical user interface, to provide a facility view of the manufacturing environment. The facility view serves as a reference plane for placement and orientation of antennas associated with the RFID readers, for placement of location benchmark tags, and for specifying physical locations of interest within the system environment. Location benchmark tags are defined herein as RFID tags temporarily or permanently attached to a known physical part of the system environment. For example, a location benchmark tag may be embedded in a floor or in a wall, or attached to a pillar, a shelf, a conveyor belt, or a vehicle. Because the user specifies their actual physical locations within the system environment on the facility view, these RFID tags may be employed as location benchmarks during subsequent control of the RFID system components.

In addition, the user may assign properties to the reader antennas and the physical locations via the facility view of the system environment. For example, the reader antenna properties may include the antenna position, orientation, elevation, azimuth, and transmit power, and the sensitivity, range, and propagation paths of RFID tags within the RF interrogation zone of the antenna. Each antenna position may be indicated using 2 or 3-dimensional coordinates. Further, the properties associated with the physical locations may include the name of the location, a description of the location, an RFID tag filter specification for that location, the location priority (low, medium, or high), the tag pace through that location (slow, medium, or fast), the tag range within that location (short, medium, or long), and an indication of the tag flux in that location.

As described above, the facility view serves as a reference plane for placing and orienting the antennas associated with the RFID readers. After each antenna is placed and oriented on the facility view of the RFID system environment, the client software application, referred to herein as the "processing tool", automatically computes an estimate of the size and shape of the RF interrogation zone of each antenna based upon the antenna pattern and transmit power, the RFID tag sensitivity and propagation paths, and the expected types of interference, and displays representations of the interrogation zones of the antennas on the facility view via the graphical user interface, thereby providing the RF coverage view of the system environment.

Next, the user may import a CAD drawing representation of at least one set of physical locations of logical or business interest within the system environment, or may manually draw each set of physical locations of interest using the graphical user interface, to provide a location view of the system environment. For example, exemplary physical locations of interest within the system environment may be designated according to their functions within the environment, e.g., shipping, receiving, outgoing, incoming, long term storage, active shelves, re-packing, etc. Each set of physical locations is referred to herein as a physical perspective. For example, the user may have a particular interest in the RFID tags moving into and out of these specified physical locations, and/or whether or not RFID tags may be currently found within these locations. The physical locations specified by the user in the location view may take the form of 2-dimensional (e.g., polygonal) or 3-dimensional (e.g., polyhedral) geometrical shapes, and may intersect with, overlap, or be wholly contained within one or more of the other specified locations.

Using the graphical user interface, the user may generate a composite of the facility view, the RF coverage view, and the location view to obtain a visual understanding of how the system components and the physical locations exist within the system environment, and how the components and locations are associated with one another. For example, the user may employ the composite of the multiple views to visualize the associations between the RF interrogation zones of the antennas and the specified physical locations within the system environment. The RF interrogation zones indicate those areas within the system environment where RFID tags are likely to be detected by an RF receiver, and the specified physical locations are indicative of the information required by the user, e.g., information relating to shipping, receiving, etc. The overlapping regions of the RF interrogation zones and the specified physical locations, as shown in the composite of the facility, coverage, and location views, indicate those areas within the system environment in which RFID tag interrogations by an RF interrogator will likely provide information pertinent to the user's requirements. Because interrogations of RFID tags outside of the overlapping regions of the interrogation zones and the physical locations are unlikely to provide pertinent user information, interrogations of tags in those areas can be limited or avoided altogether to increase the efficiency of the RFID system.

By allowing information to be entered regarding associations between components of an RFID system and specified physical locations within an environment in which the RFID system is deployed, providing a visual indication of the resulting configuration data from a facility view, an RF coverage view, and a location view of the data, and permitting properties to be assigned to the system components and physical locations with a visual understanding of how the components and locations exist within the system environment, the presently disclosed system and method provides for more cooperative information gathering among the various system components, and more meaningful decision making based upon the acquired information, thereby allowing the business purpose of the RFID system to be more easily attained.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

U.S. Provisional Patent Application No. 60/727,453 filed Oct. 17, 2005 entitled CONFIGURATION MANAGEMENT SYSTEM AND METHOD FOR USE IN AN RFID SYSTEM INCLUDING A MULTIPLICITY OF RFID READERS is incorporated herein by reference.

A system and method is provided that manages the configuration and control of components of a radio frequency identification (RFID) system, taking into account how the RFID system components are associated with one or more physical locations within an environment in which the RFID system is deployed. The presently disclosed system allows associations between the system components and the physical locations to be specified in a dynamic fashion based primarily upon how the various components are used within the system environment. In addition, the presently disclosed system allows logical and physical relationships between the system components and the physical locations to be determined in accordance with how the components and locations are associated with one another. By permitting properties to be assigned to both the system components and the physical locations, while presenting an enhanced visual representation of how the components and locations exist within the system environment, the disclosed system and method provides for more cooperative information gathering among the various system components, and more meaningful decision making based upon the acquired information, thereby allowing the business purpose of the RFID system to be more easily attained.

Figure 1:
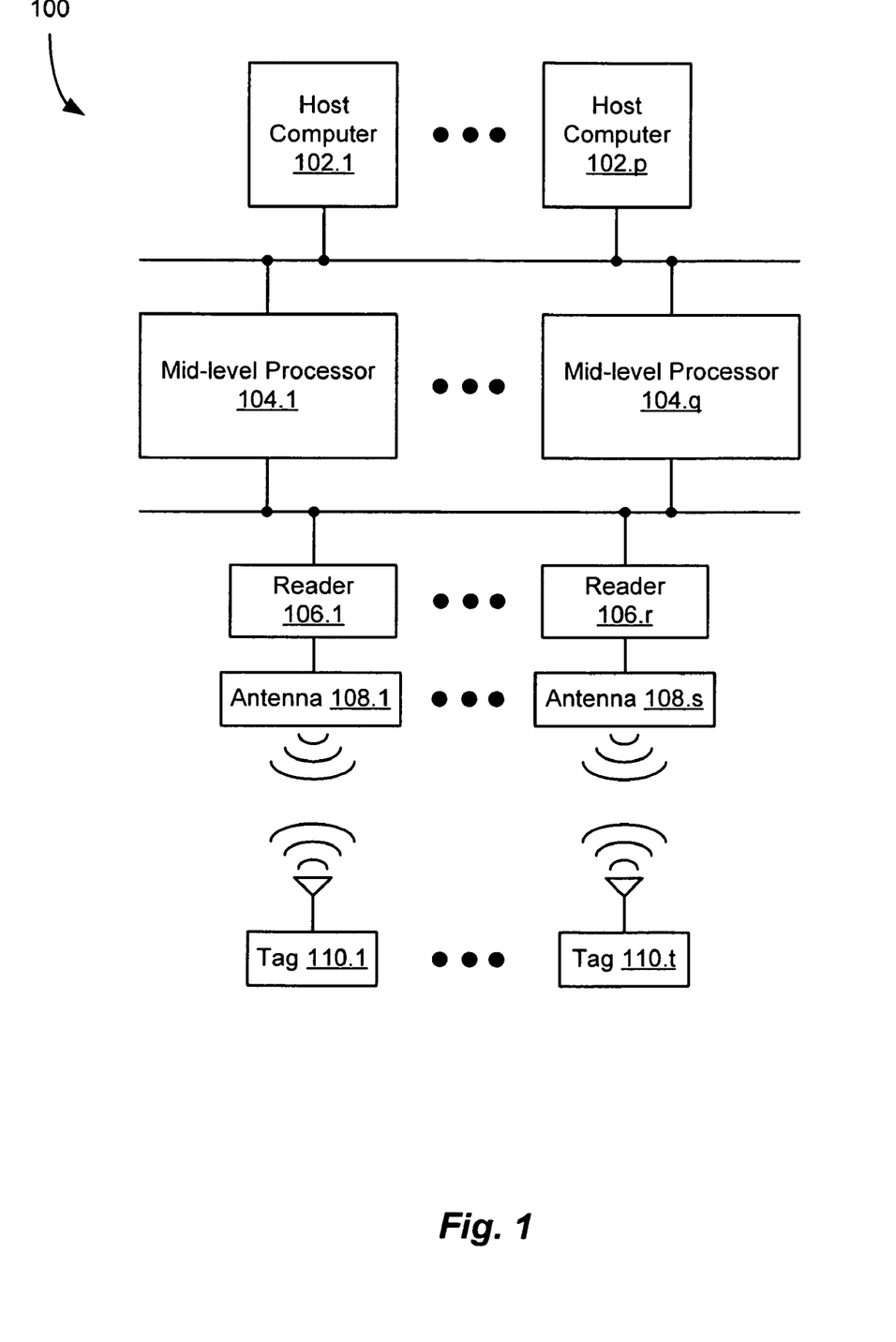
FIG. 1 is a block diagram of an RFID system architecture in which a system for managing the configuration and control of RFID system components may be employed, according to the present invention.

FIG. 1 is an illustrative embodiment of an RFID system architecture 100 in which a system for managing the configuration and control of RFID system components may be employed, in accordance with the present invention. In the illustrated embodiment, the RFID system architecture 100 comprises a plurality of RFID transponders or tags 110.1-110.$t$, a plurality of RFID readers 106.1-106.$r$ including a plurality of associated antennas 108.1-108.$s$, at least one host computer 102.1-102.$p$ running one or more client software applications, and at least one mid-level controller/processor 104.1-104.$q$ in communication with the RFID readers 106.1-106.$r$ and the host computers 102.1-102.$p$. Each mid-level controller/processor 104.1-104.$q$ is operative to schedule, parameterize, and coordinate RF transmissions generated by the respective readers 106.1-106.$r$, to receive tag data from the respective RFID readers 106.1-106.$r$, and to provide raw tag data, processed tag data, RFID reader location information, event information, and/or system status notifications to the host computers 102.1-102.$p$. Each mid-level controller/processor 104.1-104.$q$ is also operative to exchange RFID reader control signaling with the host computers 102.1-102.$p$ and/or the RFID readers 106.1-106.$r$, thereby providing coordinated control of the multiple readers. Each of the RFID readers 106.1-106.$r$ can be assigned to one or more of the mid-level controller/processors 104.1-104.$q$ based upon a number of considerations, including but not limited to computation and memory consumption load-balancing, co-interrogating reader balancing, overall network traffic due to co-interrogating mid-level controller/processors, and/or required redundancy and backup operation.

It should be appreciated that the functions necessary to implement the various components of the RFID system architecture 100 may be embodied in whole or in part using hardware or software or some suitable combination thereof using microprocessors, microcontrollers, digital signal processors, programmable logic arrays, data storage devices, embedded memory, ROM, RAM, FLASH memory, or any other suitable types of hardware and/or software. It is further appreciated that although the functionality of the RFID system architecture 100 is illustrated in FIG. 1 as being implemented within the respective system components listed above, the system functions may alternatively be implemented in any other suitable arrangement of components and in any other suitable form. For example, the RFID system architecture 100 may include multiple instances of each type of system component operating in a coordinated manner to deliver the required application services.

Moreover, it should be understood that each of the RFID readers 106.1-106.$r$ includes an RF interrogator component and an RF receiver component, and that the RF interrogator and the RF receiver may reside in separate units or may be integrated into a single component or device. Further, when used to refer to functions associated with RFID tag interrogation, the term "reader" should be understood to correspond to a component or device that solely performs that function or is integrated with a component or device that also performs functions associated with RF reception. Similarly, when used to refer to functions associated with RF reception, the term "reader" should be understood to correspond to a component or device that solely performs that function or is integrated with a component or device that also performs functions associated with RFID tag interrogation.

In the presently disclosed embodiment, the various components of the RFID system architecture 100 including the RFID readers 106.1-106.$r$, the host computers 102.1-102.$p$, and the mid-level controller/processors 104.1-104.$q$ are configured to communicate with each other over a network infrastructure, which may include switches, routers, bridges, hubs, media converters, and/or any other suitable types of network components. Further, the various components of the RFID system architecture 100 and the network infrastructure can be interconnected by communications links comprising Ethernet links, serial links, fiber links, ring links, wireless links, WAN links, and/or any other suitable type of communications links, depending on the connectivity requirements and the characteristics of the RFID system environment. The RFID system architecture 100 of FIG. 1 is described in further detail in co-pending U.S. patent application Ser. No. 11/194,145 filed Jul. 29, 2005 entitled INTERFERENCE MONITORING IN AN RFID SYSTEM and assigned to the same assignee of the present invention, the entire disclosure of which is incorporated herein by reference.

The presently disclosed system for managing the configuration and control of RFID system components can be embodied in a client software application running on one of the host computers 102.1-102.$p$ (e.g., the host computer 102.1) communicably coupled to the mid-level controller/processors 104.1-104.$q$. While running the client software application embodying the present invention, the host computer 102.1 has access to configuration databases within the mid-level controller/processors 104.1-104.$q$, storing information relating to RFID reader locations within the system environment, RFID reader types, location benchmark tags disposed throughout the environment, reader-to-reader interference and interactions, and/or any other suitable system configuration information. The client software application embodying the present invention, referred to herein as the "processing tool", may be configured to allow a human operator (the "user") to enter information specifying associations between the components of the RFID system architecture 100 and the physical locations within the system environment via a graphical user interface (GUI) displayed on a display monitor of the host computer 102.1, or via any other suitable mechanism for entering such information. The processing tool processes the information specifying the component and location associations to generate configuration data, which serve as input to signal transmission/time scheduling algorithms executed by the mid-level controller/processors 104.1-104.$q$ for controlling the various RFID system components.

It is noted that at least some of the information specifying the associations between the RFID system components and the physical locations within the system environment may be collected by the RFID system components themselves. For example, each of the mid-level controller/processors 104.1-104.$q$ may be configured to exercise protocols necessary to discover new RFID readers/antennas and new RFID tags and infrastructure devices within the system environment, to perform automatic configuration and filling of data tables, and to perform automatic measurements of component or device properties, workflow properties, trigger input settings, and tag flow and statistics. In addition, the mid-level controller/processors 104.1-104.$q$ and the RFID readers 106.1-106.$r$ and their associated antennas 108.1-108.$s$ may be configured to employ location benchmark tags disposed throughout the system environment to make determinations of system configuration and placement parameters, and to employ integrated transducers or environmental sensors incorporated into at least some of the RFID tags 110.1-110.$t$ to determine the nature of the physical surroundings and to make measurements corresponding thereto.

Figure 2:
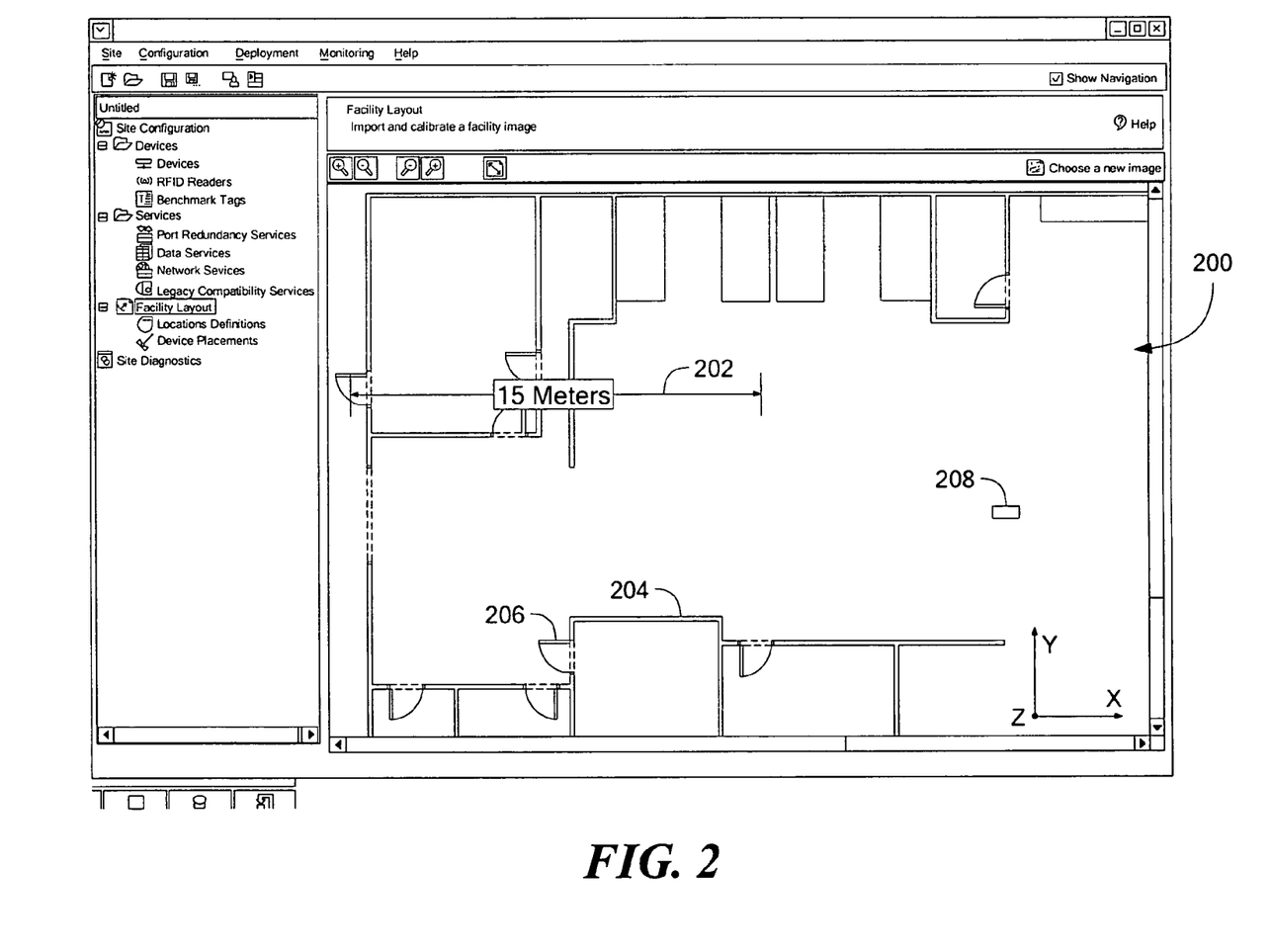
FIG. 2 is a screen shot depicting an imported or manually drawn layout of a facility view of configuration data employed by the system of FIG. 1.

In the presently disclosed embodiment, the graphical user interface provides visual representations of the configuration data generated from the associations between the RFID system components and the physical locations within the system environment from three different but inter-related views, namely, a facility view, an RF coverage view, and a location view. FIG. 2 depicts a screen shot showing an exemplary facility view screen 200, which may be accessed via the processing tool. As shown in FIG. 2, the facility view screen 200 provides a graphical representation of the facility layout of the environment in which the RFID system is deployed, including a number of partitions or walls such as a wall 204, and a number of passageways or doorways such as a doorway 206. The facility view screen 200 also provides indications of a distance scale 202 and a coordinate system X,Y,Z. For example, the user may import a CAD drawing representing the facility layout, or may manually draw the facility layout using the graphical user interface, to generate the facility view of the RFID system environment. The facility view serves as a reference plane for placement and orientation of antennas associated with the RFID readers 106.1-106.$r$, for placement of location benchmark tags such as a location benchmark tag 208, and for specifying physical locations of interest within the system environment.

For example, the user may select the RFID readers and associated antennas to be used within the facility from a predefined list of modeled readers and antennas. Alternatively, the user may create new RFID reader templates and specify custom properties for the readers and their associated antennas. For example, the properties related to the antennas 108.1-108.$s$ may include the antenna position, orientation, elevation, azimuth, and transmit power, and the sensitivity, range, and propagation paths of the RFID tags 110.1-110.$t$ within the RF interrogation zones of the respective antennas. An RF interrogation zone of an antenna associated with an RFID reader is defined herein as the physical space within which the RFID reader can successfully perform RF interrogations of tags. Location benchmark tags are defined herein as RFID tags temporarily or permanently attached to known physical parts of the RFID system environment. For example, the location benchmark tag 208 may be embedded in a floor of the facility. Alternatively, one or more location benchmark tags may be embedded in a partition or a wall, and/or attached to a pillar, a shelf, a conveyor belt, or a vehicle. Because the user specifies their actual physical locations within the system environment on the facility view screen 200, these tags may be employed as location benchmarks during subsequent control of the RFID system components.

In addition, the user may specify properties associated with the facility such as authentication requirements and passwords for user authentication, authentication requirements and passwords for the RFID readers 106.1-106.$r$ for use in authenticating these components with the mid-level controller/processors 104.1-104.q, and authentication requirements and passwords for the mid-level controller/processors 104.1-104.q for use in authenticating these components with network servers and/or other network devices, and service authorization of the RFID readers 106.1-106.r and the mid-level controller/processors 104.1-104.q for certain service subscriptions. The user may also specify authentication properties for the RFID tags 110.1-110.t, for example, for those RFID tags configured to perform security handshakes. It is noted that such authentication may include access-collision lockout, whereby only a single authorized system component can write information at one time.

For example, the facility view screen 200 may employ a 2-dimensional coordinate system X,Y to provide a planar view of the facility. It should be appreciated, however, that the facility view screen 200 may alternatively employ a 3-dimensional coordinate system X,Y,Z to provide a volumetric view of the facility. In still another embodiment, the facility view may be composed of multiple 2-dimensional slices to provide a "sliced-planar" view of the facility. Such a sliced-planar view is defined herein as a view of samples of 3-dimensional space formed by stacking multiple planes to create the third dimension.

As further described above, each of the RFID readers 106.1-106.r is assigned to one or more of the mid-level controller/processors 104.1-104.q. Within the RFID system architecture 100 (see FIG. 1), the mid-level controller/processors 104.1-104.q are not configured to transmit RF signals for interrogating the RFID tags 110.1-110.t. Instead, the mid-level controller/processors 104.1-104.q are configured to control, monitor, and receive tag data from the RFID readers 106.1-106.r, which perform the actual tag interrogations. For this reason, the user does not normally place representations of the mid-level controller/processors 104.1-104.q on the facility view screen 200. The user may specify properties of the mid-level controller/processors 104.1-104.q via the processing tool, however, including failover instructions, data base management settings, tag access control lists to be downloaded to the RFID readers 106.1-106.r, network properties, and services configurations and time protocol configurations (e.g., Network Time Protocol, NTP) that may run on the respective mid-level controller/processor to establish time synchronization with and among the RFID readers 106.1-106.r.

Figure 3:
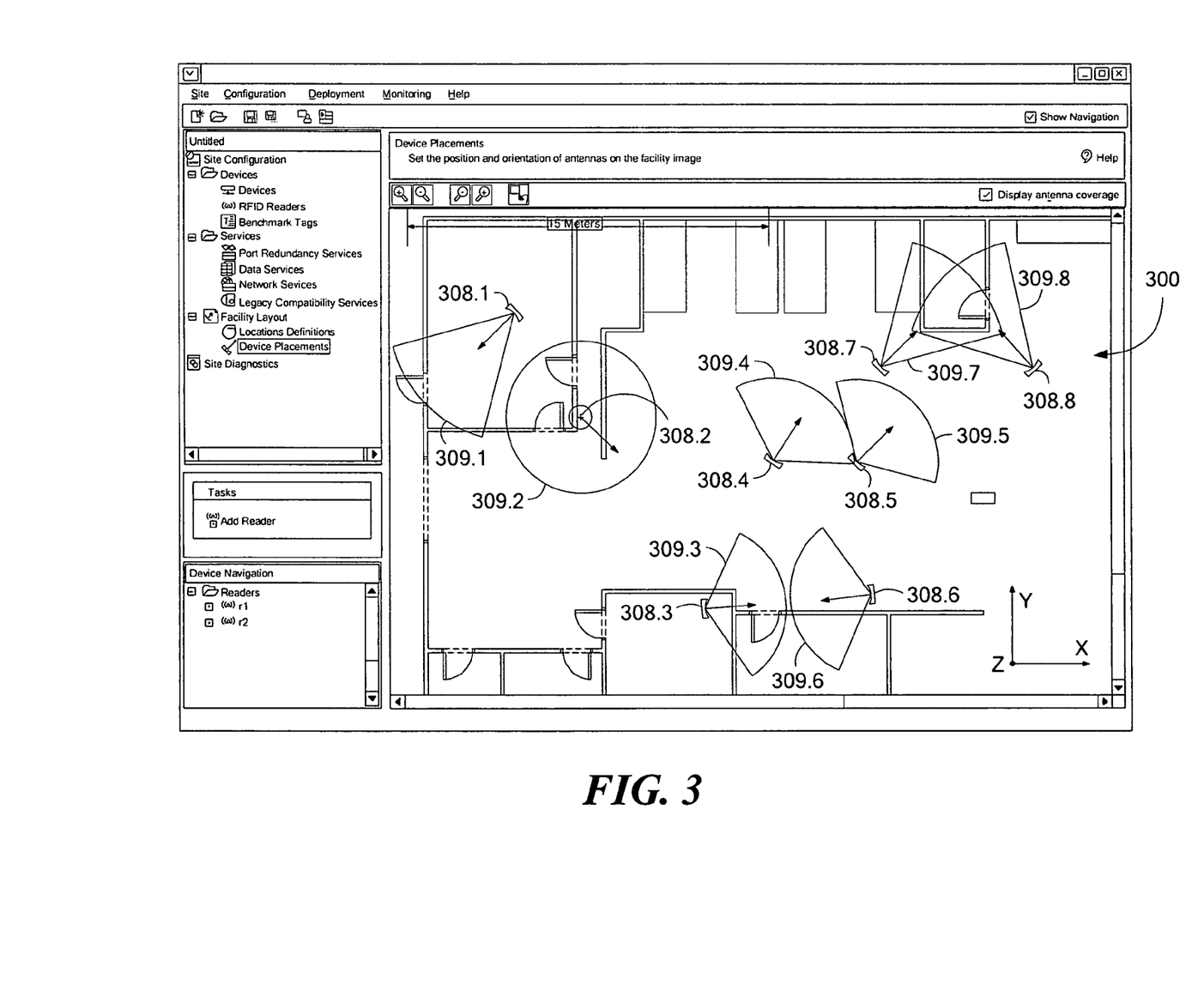
FIG. 3 is a screen shot depicting antenna placements and orientations and associated RF interrogation zones within an RF coverage view of the configuration data employed by the system of FIG. 1.

FIG. 3 depicts a screen shot showing an exemplary RF coverage view screen 300, which may be accessed via the processing tool. As shown in FIG. 3, the RF coverage view screen 300 employs the facility view (see also FIG. 2) as the reference plane for placing and orienting antennas 308.1-308.8 associated with the RFID readers 106.1-106.r via the graphical user interface. After each of the antennas 308.1-308.8 is placed and oriented with reference to the facility view of the RFID system environment, the processing tool automatically computes an estimate of the size and shape of the RF interrogation zone of each antenna based upon, e.g., the antenna pattern and transmit power, the tag sensitivity and propagation paths, and the expected types of interference. For example, the processing tool may compute estimates of the size and shape of RF interrogation zones 309.1-309.8 associated with the antennas 308.1-308.8, respectively, as depicted on the RF coverage view screen 300. The processing tool then causes representations of the RF interrogation zones 309.1-309.8 to be displayed on the display monitor of the host computer 102.1.

Each of the RF interrogation zones 309.1-309.8 corresponds to a unique read point within the facility, in which each read point is specified by an antenna ID and a transmit power level. Each read point can therefore be transformed into a new read point by simply changing the transmit power of the corresponding antenna. In the presently disclosed embodiment, the RF coverage fields of the RF interrogation zones 309.1 and 309.3-309.8 are represented by sideways beams emanating from the respective antennas 308.1 and 308.3-308.8 in the X-Y plane. Further, the RF coverage field of the RF interrogation zone 309.2 is represented by an oval or substantially circular beam emanating from the antenna 308.2 along the Z-axis (perpendicular to the drawing sheet), indicating that the beam is pointing away from or toward the user viewing the RF coverage view screen 300. It is noted that an RFID tag may be limited in range by the level of the energizing beam generated by an RFID reader. Such RFID tags are referred to herein as being "energizing field limited". An RFID tag may also be limited in range by the level of the return backscatter relative to the level of interference at an RFID reader. Such RFID tags are referred to herein as being "backscatter limited". The processing tool may take into account whether RFID tags are energizing field limited or backscatter limited when determining the sizes and shapes of the projections of the RF interrogation zones 309.1-309.8.

In one embodiment, the antennas 308.1-308.8 are fixed-location antennas, and are placed on the reference plane of the facility view in locations and orientations corresponding to the locations and orientations of the actual antennas within the facility (see FIG. 3). It is noted that it is normally not necessary to place representations of the RFID readers associated with the antennas 308.1-308.8 on the reference plane of the facility view. Instead, the user typically specifies the type of each RFID reader employed, so that the control interface, reader capabilities, and available services are known to the processing tool, thereby allowing the RFID reader resources to be properly managed. For example, each of the RFID readers may drive a single integrated antenna, or may drive multiple antennas. In an alternative embodiment, smart antennas may be employed having an integrated RFID reader or reader chip.

As described above, the user may select the RFID readers and antennas to be used within the facility from a predefined list of modeled readers and antennas. There are several different types of RFID readers and antennas that can be modeled, but each RFID reader typically has a set of specific antenna manufacturers and part numbers that are approved for use with that reader. For example, the antenna gain and the antenna pattern may be modeled using an equation that estimates the RF field for that antenna, thereby allowing the field strength to be estimated at different angles. These field strength estimates may be used to estimate possible interactions among the multiple RFID readers. The antenna pattern may be obtained empirically from lab measurements or dynamically from field measurements, and an indication of the antenna pattern may be provided to the processing tool via the graphical user interface. Alternatively, the antenna pattern may be obtained from a data sheet. The location of each of the antennas 308.1-308.8 on the reference plane of the facility view may be indicated using 2-dimensional coordinates X,Y or 3-dimensional coordinates X,Y,Z. The 2 or 3-dimensional field strength estimates of the antennas 308.1-308.8 may therefore be calculated using the X,Y,Z coordinates or some subset thereof, three pointing angles of the antennas 308.1-308.8 or some subset thereof, and the RF parameter settings (e.g., the power setting, antenna orientation, etc.) of the associated RFID readers.

It is noted that the pattern associated with each of the antennas 308.1-308.8 has a degree of directionality. Specifically, the bore-sight of each antenna corresponds to the direction of the center of the gain pattern for that antenna in all directions. The direction in which an antenna is pointed may be described with reference to the azimuth and elevation angle of the bore-sight vector, or the twist of the antenna about the bore-sight vector with respect to the normal orientation of the antenna.

As described above, the antennas 308.1-308.8 may be placed and oriented with reference to the facility view of the RFID system environment at specified locations indicated by 2 or 3-dimensional coordinates. As shown in FIG. 3, the locations of the antennas 308.1-308.8 are indicated on the planar RF coverage view screen 300 by the 2-dimensional coordinates X,Y. It is noted, however, that the third dimensional coordinate Z may also be specified, representing the height of an antenna from the floor of the facility, or from any other suitable reference plane. The actual X, Y, and/or Z coordinates indicating the antenna locations are employed by the processing tool for performing internal calculations, and are not typically displayed on the RF coverage view screen 300.

For example, multiple antennas such as the antennas 308.1-308.8 may be designated on a hyperlink list, and the user may drag and drop selected ones of the antennas 308.1-308.8 as objects on the reference plane of the facility view. The X,Y coordinates of the locations of these antenna objects are then automatically determined by the processing tool based upon where the objects are placed on the reference plane. Next, the user may employ a pull-down window to specify the third dimensional coordinate Z of the antenna location. The user may then specify the orientations or pointing angles of the antennas 308.1-308.8 via the graphical user interface by conceptually grabbing an antenna icon and rotating the antenna bore-sight so that the antenna points in a desired direction within the facility. Next, the user may specify the antenna elevation angle and twist, for example, via a pull-down window. In one embodiment, the processing tool may automatically determine the location of an incident plane relative to the location of an associated antenna, indicating where RFID tags of interest are expected to be located with respect to that antenna, as discussed below. In addition, the processing tool may be configured to take into account the RF penetration difficulty of interrogating RFID tags when determining the RF parameter settings of the RFID readers.

Although the locations of the antennas 308.1-308.8 are indicated on the RF coverage view screen 300 with reference to a planar view of the facility, it should be appreciated that the facility view may be configured using multiple planar views, thereby allowing placement and orientation of the antennas 308.1-308.8 at specified heights above the facility floor. In an alternative embodiment, a fully 3-dimensional view of the facility may be provided to allow substantially arbitrary antenna placements and orientations, and calculations of volumetric interactions with reference to the 3-dimensional coordinates X, Y, Z.

Figure 4:
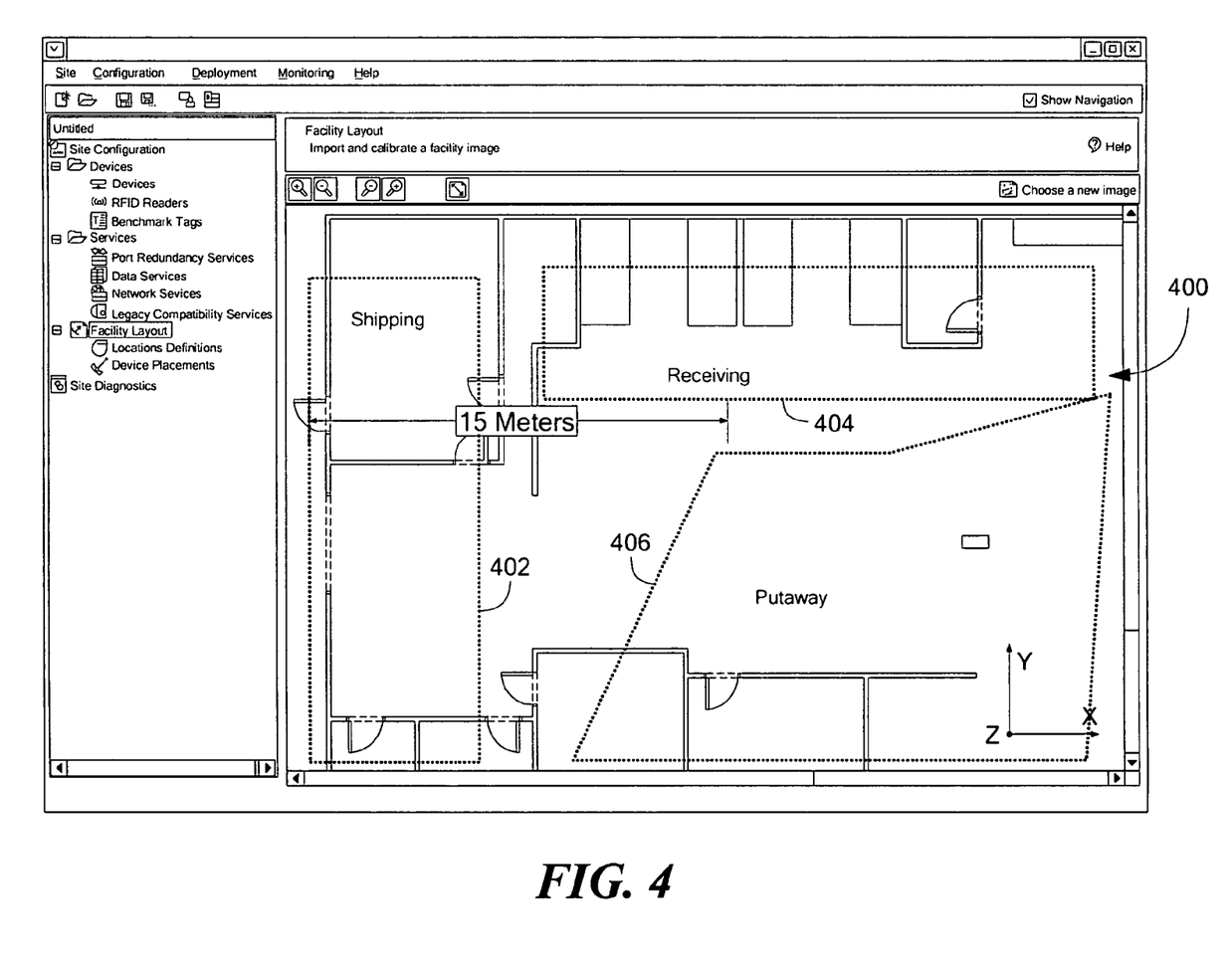
FIG. 4 is a screen shot depicting a number of specified physical locations within a location view of the configuration data employed by the system of FIG. 1.

FIG. 4 depicts a screen shot showing an exemplary location view screen 400, which may be accessed via the processing tool. As shown in FIG. 4, the location view screen 400 employs the facility view (see also FIG. 2) as the reference plane for indicating a plurality of physical locations 402, 404, 406 within the facility. For example, the user may import a CAD drawing representation of the set of physical locations 402, 404, 406, or may manually draw each of the physical locations 402, 404, 406 using the graphical user interface. Each of the physical locations 402, 404, 406 corresponds to an area or a boundary of logical and/or business interest within the facility. In the presently disclosed embodiment, each of the physical locations 402, 404, 406 is designated by the user according to its function, i.e., shipping 402, receiving 404, and put-away 406. For example, the user may have particular interests in RFID tags moving into and out of these areas. It is noted that the physical locations included in the set of physical locations 402, 404, 406 may take the form of 2-dimensional (e.g., polygonal) or 3-dimensional (e.g., polyhedral) geometrical shapes, and may intersect, overlap, or be wholly contained within one or more of the other specified locations, possibly resulting in multiple sets of properties and requirements within the intersecting or overlapping regions. The user may employ the designations of the physical locations 402, 404, 406 to specify how tag reads are to be reported within the facility by the processing tool.

It is noted that the user may define one or more sets of physical locations within a facility, in which each of the sets of physical locations is referred to herein as a "location perspective". Like the individual physical locations, the location perspectives may intersect, overlap, or be wholly contained within one or more other location perspectives, possibly resulting in multiple sets of properties and requirements within the intersecting or overlapping spaces. In addition, the user may specify properties of the physical locations and the location perspectives, including the name of the location, a description of the location, a tag filter specification for that location, the location priority (low, medium, or high), the tag pace through that location (slow, medium, or fast), the tag range within that location (short, medium, or long), and an indication of the tag flux within that location.

Figure 5:
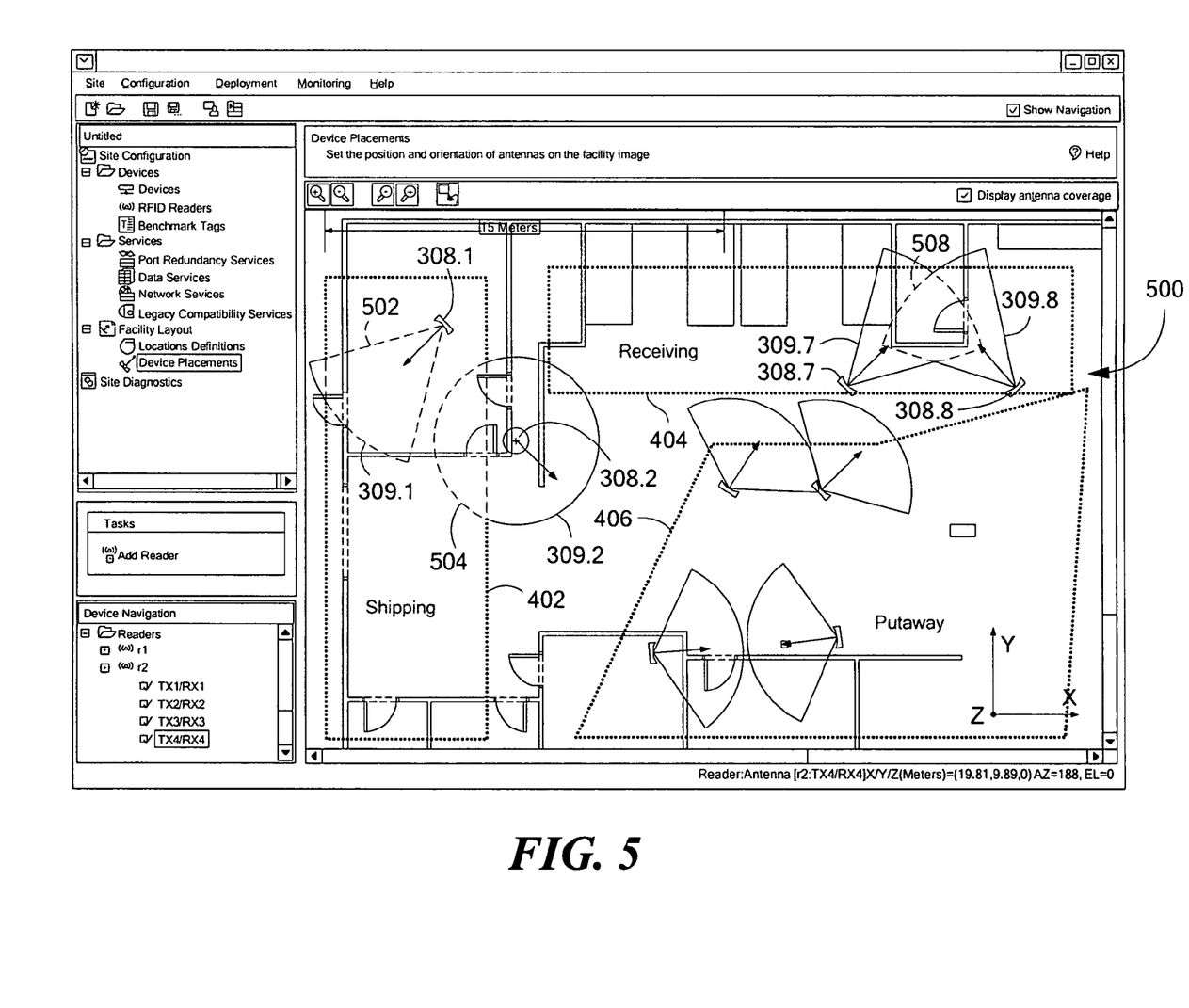
FIG. 5 is a screen shot depicting a composite of the facility view of FIG. 2, the RF coverage view of FIG. 3, and the location view of FIG. 4.

FIG. 5 depicts a screen shot showing an exemplary composite view screen 500, which may be accessed via the processing tool. As shown in FIG. 5, the composite view screen 500 employs the facility view (see also FIG. 2) as the reference plane for providing a composite view of the RF interrogation zones 309.1-309.8 and the physical locations 402, 404, 406. The processing tool automatically associates the RF interrogation zones 309.1-309.8 and the physical locations 402, 404, 406 based upon perimeter boundaries, surfaces, and/or volumetric overlaps of the respective interrogation zones and physical locations (see, e.g., an overlap space 502 formed by the overlap of the RF interrogation zone 309.1 and the physical space 402, an overlap space 504 formed by the overlap of the RF interrogation zone 309.2 and the physical space 402, and an overlap space 506 formed by the overlap of the RF interrogation zone 309.2 and the physical space 404). The RF interrogation zones 309.1-309.8 indicate those areas within the facility in which RFID tags are likely to be read by the RFID readers 106.1-106.r, and the physical locations 402, 404, 406 indicate those areas within the facility in which the user (or an automated application acting as a user proxy) likely has an interest in obtaining information. Accordingly, tag data acquired by the RFID system from tag interrogations occurring within the spaces defined by the overlap of the RF interrogation zones 309.1-309.8 and the physical locations 402, 404, 406 generally constitute pertinent user data.

It is noted that the multiple RFID readers and their associated antennas can generate overlapping RF interrogation zones, which are 3-dimensional spatial volumes referred to herein as "overlap segments" (see, e.g., an overlap segment 508 formed by the overlap of the RF interrogation zones 309.7-309.8). The size and shape of these overlap segments can be adjusted by adjusting the transmit power of the associated antennas. Further, tag data and other associated information acquired by the RFID readers from tag interrogations occurring within these overlap segments can be combined to estimate the locations of the RFID tags. For example, if a given overlap segment is not required to determine whether an interrogated tag is inside or outside of a particular physical location, then that overlap segment may be removed from the RF interrogation requirements provided to one or more of the mid-level controller/processors $104.1$-$104.q$. Overlap segments may be depicted with reference to a planar facility view, multiple planar facility views, or a fully 3-dimensional facility view. In addition, RF interference zones within the facility may be depicted in a manner similar to the overlap segments. Such interference zones may be pre-calculated based upon specific RF equations, known and/or measured RF parameters associated with the RFID readers, RFID tags, and RF channels, and/or RF parameters associated with location benchmark tags placed within the facility for purposes of measuring environmental data and/or for self-location of an RFID reader.

As discussed above, via the composite view screen 500 (see FIG. 5), the user may obtain a visual understanding of how the RFID system components such as the antennas 308.1-308.8 and the physical locations 402, 404, 406 exist within the facility, and how the RF interrogation zones 309.1-309.8 and the physical locations 402, 404, 406 are associated with one another. The RF interrogation zones 309.1-309.8 indicate those areas within the facility where RFID tags are likely to be detected by an RFID reader, and the specified physical locations 402, 404, 406 are indicative of the types of information required by the user or one or more automated applications running on the host computers $102.1$-$102.p$. In the presently disclosed embodiment, the types of information required by the user or application include information relating to shipping, receiving, and put-away functions, which correspond to the physical locations 402, 404, and 406, respectively. The spaces defined by the overlapping regions of the RF interrogation zones and the physical locations (e.g., the overlap spaces 502, 504, 506, 508) indicate those areas within the facility in which tag interrogations by one or more of the RFID readers $106.1$-$106.r$ will generally provide information pertinent to the user's or application's requirements. In one embodiment, the tag data acquired by the RFID readers $106.1$-$106.r$ from tag interrogations are compiled into data files by the respective readers, and then transmitted to the mid-level controller/processors $104.1$-$104.q$, which translate the tag data into the business information, physical event information, and/or any other suitable information required by the user or application. Because interrogations of tags outside of the overlapping regions of the interrogation zones and the physical locations are unlikely to provide such pertinent information, interrogations of tags within those areas can be limited or avoided altogether to increase the efficiency of the RFID system.

Having described the above illustrative embodiments, other alternative embodiments or variations may be made. For example, the physical locations or location perspectives specified within a facility of interest may have a number of static or dynamic relationships involving, for example, property inheritance, tag observations, and/or transitions between locations. In addition, the associations between the RF interrogation zones and the physical locations within the facility may extend across multiple mid-level controller/processors. The commissioning of RFID readers and mid-level controller/processors within the facility may therefore involve specifying which RFID readers are controlled by which mid-level controller/processors, both as primary agents and as backup agents. Certain facility services may also be shared among the mid-level controller/processors. Moreover, the placement of the RFID system components and the physical locations, and the specification of the properties relating to the components and locations, can be made to apply to multiple representations of the facility layout.

In addition, each mid-level controller/processor within the RFID system can be configured to send, to one or more host computers, indications of the status of the RFID readers, sample tag data, and/or data statistics such as logs of collections of events and their chronology for real-time debugging, testing, and/or verification of the RFID system operation. Further, each mid-level controller/processor can be configured to compare current facility configurations (e.g., the RFID system component and physical location placements and their corresponding properties) with stored configurations, to perform block replications so that common operations need not be repeatedly described in detail, to update incrementally information files relating to the current facility configuration, and to perform diagnostics to determine whether or not unusable facility configurations have been specified.

In addition, it was described that the antennas 308.1-308.8 associated with the RFID readers $106.1$-$106.r$ are fixed-location reader antennas. It should be appreciated, however, that RFID readers can be mobile. Such mobile RFID readers can be specified within the RFID system by indicating their physical platforms, for example, whether they are hand-held, forklift mounted, etc. Further, the antennas associated with the mobile readers may be oriented in a manner similar to the antennas associated with the fixed readers. The mobile RFID readers may also be used in conjunction with fixed location benchmark tags disposed throughout a facility to determine their respective locations within the facility.

Specifically, the processing tool can be configured to associate the RF interrogation zones of the antennas of mobile RFID readers with the physical locations within the facility using a number of techniques, which are referred to herein as the "candidate path" technique, the "translation" technique, and the "sample space" technique. The candidate path technique allows the user, using a CAD drawing of the facility or any other suitable representation of the facility, to specify at least one path that the mobile RFID reader may take as it traverses the facility. The processing tool then causes at least one RF coverage trail to be displayed in the RF coverage view, corresponding to the RF interrogation zone of the mobile reader. The processing tool also causes the overlap coverage of the mobile RF interrogation zones, the location benchmark tags, and the physical locations to be displayed in the composite of the facility view, the RF coverage view, and the location view.

The translation technique is operative to translate the in-place coverage zone of the mobile RFID reader with reference to the location benchmark tags and specified physical locations to indicate the inverse coverage of the mobile reader, which is defined herein as the zone in which the mobile reader must be located to interrogate RFID tags. The associations of the RF interrogation zones and the physical locations may include known location information such as the locations of the location benchmark tags and previously interrogated RFID tags to determine the location of the mobile reader. The sample space technique allows the user to select specific mobile reader locations of interest to create samples of the mobile reader path of mobility, in which the samples become pseudo-fixed reader locations that can change over time. The orientation of the mobile reader may then be determined by interrogating the location benchmark tags disposed at the known locations, and/or by analyzing reader-to-reader transmissions.

In addition, it was described that the RF interrogation zone of each antenna associated with an RFID reader corresponds to a unique read point within the facility of interest, in which the read point is specified by the antenna ID and the corresponding transmit power. A set of read points, referred to herein as a connected reader set (CRS), can be formed, in which each read point has an RF interrogation zone that overlaps the interrogation zone of at least one other read point in the set. For example, if the RF interrogation zone of a read point "A" overlaps the interrogation zone of a read point "B", and the RF interrogation zone of the read point B overlaps the interrogation zone of a read point "C", then a connected reader set including the read points A,B,C is formed, whether or not the RF interrogation zones of the read points A and C overlap. A connected reader set can therefore be formed in which all of the RF interrogation zones of the respective read points overlap, or in which each RF interrogation zone overlaps only one other interrogation zone, conceptually forming a chain of overlapping interrogation zones. A given facility can include one or more connected reader sets.

It is noted that the overlap and non-overlap of RF interrogation zones of a number of logical RFID readers can be used to generate a set of connected graphs, in which each logical reader is represented by a node in one of the graphs. A logical reader is defined herein by the identify of a physical RFID reader, and the set of RF parameters that were in effect at the time a reported tag interrogation was collected by that physical reader. A logical reader therefore has an associated RF interrogation zone. Within the set of connected graphs, there is an edge between node "i" and node "j" if the RF coverage area of the logical reader at node i overlaps the RF coverage area of the logical reader at node j. With reference to a set of connected graphs, a connected reader set is formed by a set of nodes having a path between them comprising one or more edges. By definition, a connected reader set cannot be connected to another connected reader set. A logical reader, or a node corresponding to a logical reader in a connected graph, can therefore be a part of only one connected reader set. An index can be formed including all possible combinations of unique tag interrogation results that a given connected reader set can generate. Further, for each of the indices in the index, a probability distribution can be generated indicating the most likely location of an interrogated tag with reference to the physical locations of interest within the facility.

In addition, when multiple RFID readers perform tag interrogations within the same physical space, it can be expected that an RFID tag will sometimes detect similar power levels from a number of readers. In this case, the multiple readers can be time multiplexed, because RFID tags are broadband and are typically incapable of discriminating based upon frequency by tuning to one of the readers. The processing tool can be configured to pre-calculate when such a situation is expected to occur for each read point based upon the antenna placements and orientations within the facility. Further, one or more of the mid-level controller/processors may employ this information when scheduling interrogations of the RFID tags.

In addition, each RFID reader can be configured to include inputs for one or more external proximity detectors, e.g., photoelectric (electric eye) detectors. For example, when a proximity detector is triggered, an RFID reader may be notified of the trigger event via the proximity detector input, and may then send a request to transmit to one of the mid-level controller/processors, thereby allowing RF transmissions to be scheduled, parameterized, and coordinated with one or more of the other RFID readers. The logical connections of such triggers to read points can be conveyed to the mid-level controller/processor via the processing tool. The triggers may also be rules-based. For example, the rules associated with such rules-based triggers may be based upon one or more of the following:

(1) A state change at one or more physical devices within the facility, including sensors, actuators, RFID readers, RFID tags, and/or tag data processing components. For example, such a state change may be detected via an electric eye trigger, an RFID reader receiving data from an RFID tag that matches a predefined pattern, movement of a specific tag or tag group from one location to another location, etc.

(2) A network event. For example, a packet may be received over the network having a header or content that matches a predefined pattern.

(3) A logical condition. For example, a condition may be satisfied relating to the processing of a predetermined business rule, e.g., all RFID tags contained in a list of tags have been received at a dock door within the facility.

(4) A temporal condition. For example, a tag interrogation or tag data processing function may be scheduled periodically or at a predetermined time.

(5) An application interface. For example, a notification of a predetermined event (e.g., a pallet has been received) may be sent over an application interface (e.g., Application Level Event, Java API, etc.).

In addition, it was described that the processing tool can be configured to pre-calculate interference zones based upon specific RF equations, known and/or measured RF parameters associated with the RFID readers, RFID tags, and RF channels, and/or RF parameters associated with location benchmark tags. It is noted that the RF signal level, generated by a first RFID reader, impinging on a physical space within the facility can be determined by computing the directional signal levels corresponding to other RFID readers pointing at the RF field of view of the first reader, and determining whether or not the ratio of RF signal levels is close enough to cause a reader-to-tag interference problem. Such reader-to-tag interference can result when RF signals from two or more co-interrogating RFID readers impinge on an RFID tag or tags within the interrogation zones of the respective readers. Reader-to-tag interference can render the RFID tags incapable of correctly interpreting any of the reader signals. Such RFID reader conflicts potentially existing within a facility due to such interference can be tabulated, and reader groups can be formed in which each group member cannot be transmitting or "on" at the same time as other members of the group. Overlapping reader groups can be handled by cross-group checking. For example, if an RFID reader is a member of more than one group, then one or more cross-reference tables can be generated and used to determine whether or not that reader can be turned on based upon whether or not another reader in one of the groups that reader belongs to is also turned on.

Figure 6:
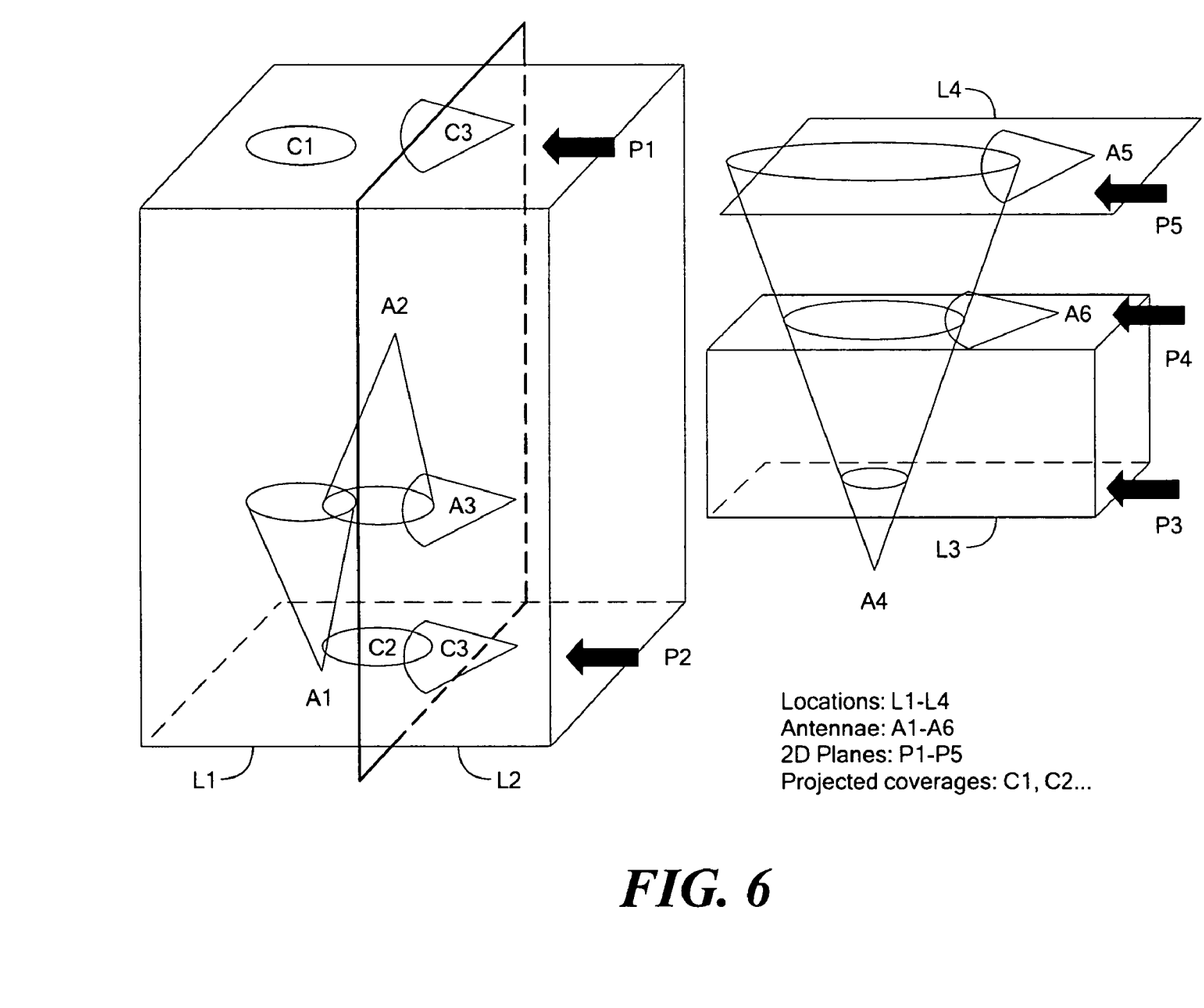
FIG. 6 is a perspective view of a number of incident planes useful for visualizing 3-dimensional placements of antennas, physical locations, and projections of RF coverage in the composite view of FIG. 5.

In addition, it was described that the processing tool may automatically specify the location of an incident plane relative to the location of an antenna associated with an RFID reader. FIG. 6 depicts a plurality of incident planes P1-P5, which can be used to visualize 3-dimensional placements of antennas A1-A6, physical locations L1-L4, and projections C1, C2, C3, etc. of RF coverage. As shown in FIG. 6, the antennas A1 and A4 are oriented so that they point in the upward direction (e.g., away from the facility floor along the Z-axis), the antenna A2 is oriented so that it points in the downward direction (e.g., toward the facility floor along the Z-axis), and the antennas A3, A5, and A6 are oriented so that they point in the westward horizontal direction (e.g., parallel to the facility floor and the X-Y plane). Each of the incident planes P1-P5 depicted in FIG. 6 is a horizontal plane. Further, each incident plane P1-P5 corresponds to at least one boundary of the physical locations L1-L4, however, not all of the boundaries of the physical locations L1-L4 necessarily correspond to an incident plane. For example, the incident plane P1 corresponds to the upper boundaries of the 3-dimensional volumetric physical locations L1 and L2, the incident plane P2 corresponds to the lower boundaries of the physical locations L1 and L2, the incident plane P3 corresponds to the lower boundary of the 3-dimensional volumetric physical location L3, the incident plane P4 corresponds to the upper boundary of the physical location L3, and the incident plane P5 corresponds to the 2-dimensional planar physical location L4. As shown in FIG. 6, each of the incident planes P1-P5 includes the RF coverage projection of one or more of the antennas A1-A6. For example, the incident plane P1 includes the projected coverages C1, C3 of the antennas A1, A3, respectively, and the incident plane P2 includes the projected coverages C2, C3 of the antennas A2, A3, respectively. Because the projected coverages C2-C3 overlap on the incident plane P2, a connected reader set is formed with respect to that incident plane, including the read points A2-A3. It is noted that each incident plane may contain one or more connected reader sets, each of which is conceptually 2-dimensional in nature. Each connected reader set may therefore be regarded as residing on an incident plane. As further shown in FIG. 6, the RF coverage of the antenna A4 is projected onto the incident planes P3-P5, the RF coverage of the antenna A5 is projected onto the incident plane P5, and the RF coverage of the antenna A6 is projected onto the incident plane P4.

Figure 7:
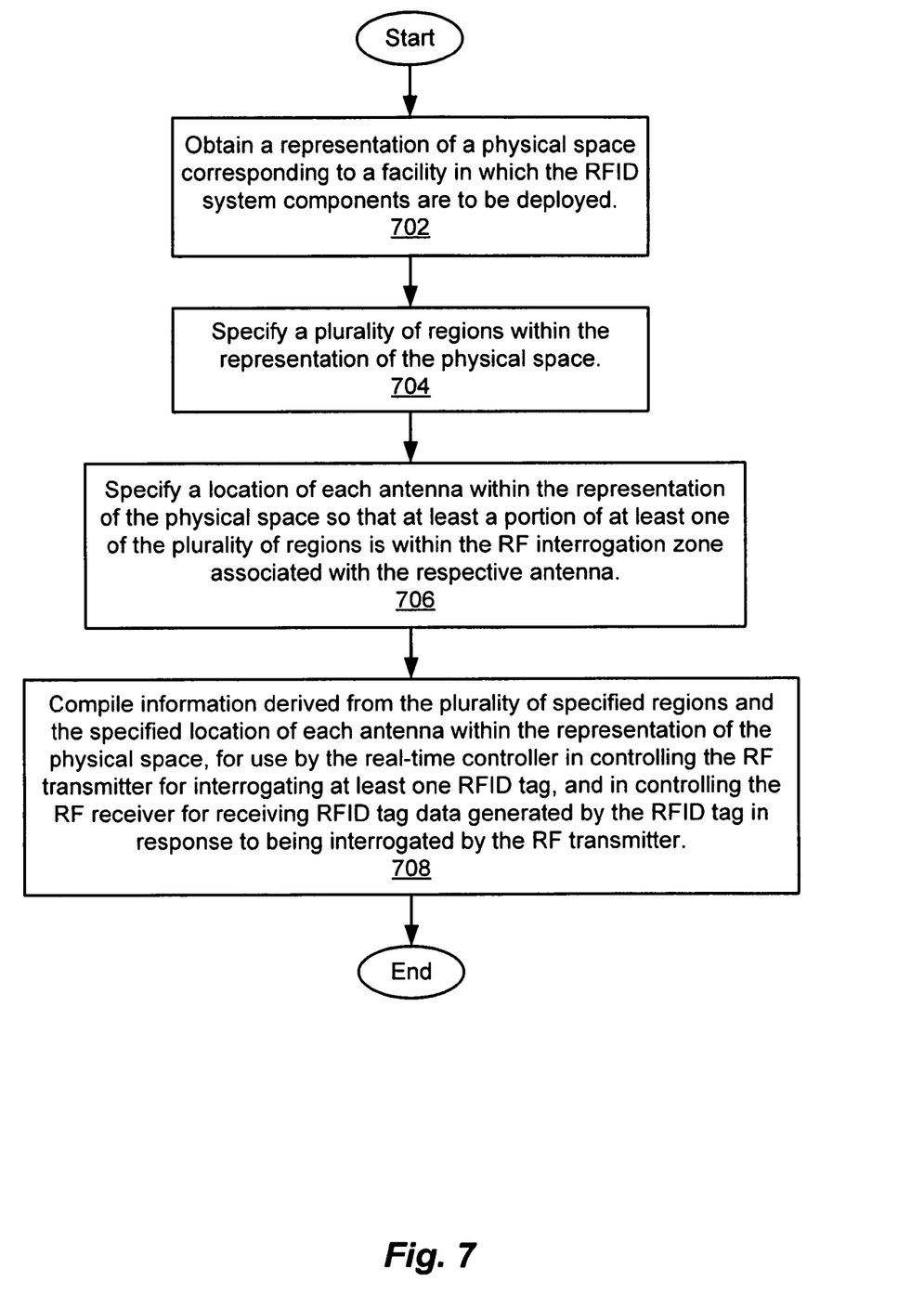
FIG. 7 is a method of operating the system of FIG. 1 for managing the configuration and control of multiple RFID system components.

A method of operating the presently disclosed system for managing the configuration and control of RFID system components is described below with reference to FIG. 7. As described above, the RFID system components include at least one RFID tag, at least one RF transmitter, at least one RF receiver, and at least one real-time controller for controlling the RF transmitter and the RF receiver, which have at least one antenna associated therewith. Each antenna has an associated RF interrogation zone. As depicted in step 702, a representation of a physical space is obtained. The representation of the physical space corresponds to a facility in which the RFID system components are to be deployed. Next, a plurality of regions within the representation of the physical space is specified, as depicted in step 704. A location of each antenna within the representation of the physical space is then specified, as depicted in step 706. The location of each antenna is specified so that at least a portion of at least one of the plurality of regions is within the RF interrogation zone associated with the respective antenna. Finally, information derived from the plurality of specified regions and the specified location of each antenna within the representation of the physical space is compiled, as depicted in step 708. The compiled information is subsequently used by the real-time controller in controlling the RF transmitter for interrogating at least one RFID tag disposed within the facility in which the RFID system components are deployed, and in controlling the RF receiver for receiving RFID tag data generated by the RFID tag in response to being interrogated by the RF transmitter.

It will further be appreciated by those of ordinary skill in the art that modifications to and variations of the above-described configuration management system and method may be made without departing from the inventive concepts disclosed herein. Accordingly, the invention should not be viewed as limited except as by the scope and spirit of the appended claims.

What is claimed is:

1. A method of generating information for use in configuration and control of an RFID (radio frequency identification) tag data acquisition system, said RFID tag data acquisition system including at least one RFID tag, at least one RF (radio frequency) transmitter, at least one RF receiver, and at least one real-time controller for controlling said at least one RF transmitter and said at least one RF receiver, said at least one RF transmitter and said at least one RF receiver having at least one antenna associated therewith, each antenna having an associated RF interrogation zone, said method comprising the steps of:

obtaining a representation of a physical space in which said RFID tag data acquisition system is to be deployed;

in a first specifying step, specifying a plurality of regions within said representation of said physical space;

in a second specifying step, specifying an association between each antenna of said at least one RF receiver and said at least one RF transmitter and at least one of said plurality of regions within said representation of said physical space, each association being specified at least in part by portions of the RF interrogation zone of the respective antenna and said at least one of said plurality of regions that overlap; and compiling information derived from said first and second specifying steps into at least one data file, for use by said at least one real-time controller in controlling said at least one RF transmitter for interrogating at least one RFID tag disposed within the overlapping portions of at least one RF interrogation zone and said at least one of said plurality of regions, and in controlling said at least one RF receiver for receiving RFID tag data generated by said at least one RFID tag in response to being interrogated by said at least one RF transmitter.

2. The method of claim 1 including the step of assigning at least one property to each antenna.

3. The method of claim 2 wherein said at least one property assigned to each antenna is selected from the group consisting of a pattern, an orientation, an elevation, an azimuth, a transmit power, a tag sensitivity level for at least one RFID tag disposed within the RF interrogation zone associated with the respective antenna, a tag range value for at least one RFID tag disposed within the RF interrogation zone associated with the respective antenna, and an indication of a propagation path for at least one RFID tag disposed within the RF interrogation zone associated with the respective antenna.

4. The method of claim 3 including the step of estimating at least one of a size and a shape of the RF interrogation zone associated with the respective antenna based at least in part upon the pattern and the transmit power assigned to the respective antenna.

5. The method of claim 4 including the step of providing a visual indication of said plurality of regions, a location of each antenna, and the size and the shape of the RF interrogation zone associated with each antenna within said representation of said physical space.

6. The method of claim 1 including the step of assigning at least one property to each of said plurality of regions.

7. The method of claim 6 wherein said at least one property assigned to each of said plurality of regions is selected from the group consisting of a name of the respective region, a description of the respective region, a tag filter specification for the respective region, a priority level for the respective region, a tag pace value for the respective region, a tag range value for the respective region, and a tag flux level for the respective region.

8. The method of claim 1 including, in a third specifying step, specifying a location of at least one location benchmark tag within said representation of said physical space.

9. The method of claim 1 wherein said first specifying step includes specifying said plurality of regions within said representation of said physical space, each of said plurality of regions having a 2-dimensional geometrical shape.

10. The method of claim 1 wherein said first specifying step includes specifying said plurality of regions within said representation of said physical space, each of said plurality of regions having a 3-dimensional geometrical shape.

11. The method of claim 1 wherein said first specifying step includes specifying said plurality of regions within said representation of said physical space so that at least two of said plurality of regions intersect one another.

12. The method of claim 1 wherein said first specifying step includes specifying said plurality of regions within said representation of said physical space so that at least two of said plurality of regions overlap one another.

13. The method of claim 1 wherein said first specifying step includes specifying said plurality of regions within said representation of said physical space so that at least one first region is wholly contained within at least one second region.

14. The method of claim 1 wherein said second specifying step includes specifying said association between each antenna and said at least one of said plurality of regions within said representation of said physical space so that at least two of said RF interrogation zones overlap one another.

15. The method of claim 14 including the step of estimating a location of at least one RFID tag disposed within the overlap of said at least two RF interrogation zones by combining information derived from tag interrogations occurring within the overlap of the at least two RF interrogation zones.

16. The method of claim 1 wherein at least one RF transmitter and at least one RF receiver are embodied in at least one mobile RFID reader, and including, in a third specifying step, specifying at least one path within said representation of said physical space that said at least one mobile RFID reader can take as it traverses said physical space.

17. The method of claim 1 wherein at least one RF transmitter and at least one RF receiver are embodied in at least one mobile RFID reader, and including, in a third specifying step, translating an in-place coverage zone associated with said at least one mobile RFID reader with reference to at least one location benchmark tag and said plurality of regions within said representation of said physical space to indicate at least one region within said physical space in which said at least one mobile RFID reader can interrogate at least one RFID tag.

18. The method of claim 1 wherein at least one RF transmitter and at least one RF receiver are embodied in at least one mobile RFID reader, and including, in a third specifying step, specifying at least one location of interest along at least one path within said representation of said physical space that said at least one mobile RFID reader can take as it traverses said physical space.

19. The method of claim 1 wherein said first specifying step includes identifying at least one incident plane associated with at least one of said plurality of regions within said representation of said physical space, said at least one incident plane being at least one horizontal plane corresponding to at least one boundary of said plurality of regions.

20. The method of claim 19 wherein said second specifying step includes providing at least one indication of at least one RF coverage projection of at least one antenna on said at least one incident plane.

21. The method of claim 20 wherein said at least one RF coverage projection comprises a plurality of RF coverage projections, and wherein at least two indications of said plurality of RF coverage projections on said at least one incident plane overlap to form at least one connected reader set.

22. A computer system for generating information for use in configuration and control of an RFID (radio frequency identification) tag data acquisition system, said RFID tag data acquisition system including at least one RFID tag, at least one RF (radio frequency) transmitter, at least one RF receiver, and at least one real-time controller for controlling said at least one RF transmitter and said at least one RF receiver, said at least one RF transmitter and said at least one RF receiver having at least one antenna associated therewith, each antenna having an associated RF interrogation zone, said computer system comprising:

at least one memory; and at least one processor operative to execute at least one computer program out of said at least one memory, said computer program being operative:

to obtain a representation of a physical space in which said RFID tag data acquisition system is to be deployed;

to specify a plurality of regions within said representation of said physical space;

to specify an association between each antenna of said at least one RF receiver and said at least one RF transmitter and at least one of said plurality of regions within said representation of said physical space, each association being specified at least in part by portions of the RF interrogation zone of the respective antenna and said at least one of said plurality of regions that overlap; and to compile information derived from the plurality of specified regions and the specified associations into at least one data file, for use by said at least one real-time controller in controlling said at least one RF transmitter for interrogating at least one RFID tag disposed within the overlapping portions of at least one RF interrogation zone and said at least one of said plurality of regions, and in controlling said at least one RF receiver for receiving RFID tag data generated by said at least one RFID tag in response to being interrogated by said at least one RF transmitter.

23. The computer system of claim 22 including at least one display, and wherein said computer program is operative to allow a human operator to specify, on said at least one display, said plurality of regions and a location of each antenna within said representation of said physical space.

24. The computer system of claim 23 wherein said computer program is operative to allow a human operator to specify, on said at least one display, said plurality of regions and the location of each antenna within said representation of said physical space via a graphical user interface.

25. The computer system of claim 22 wherein said computer program is operative to estimate at least one of a size and a shape of the RF interrogation zone associated with the respective antenna based at least in part upon a pattern and a transmit power associated with the respective antenna.

26. The computer system of claim 25 including at least one display, and wherein said computer program is operative to provide, on said at least one display, a visual indication of said plurality of regions, a location of each antenna, and the size and the shape of the RF interrogation zone associated with each antenna within said representation of said physical space.

* * * * *